Patented Mar. 25, 1941

2,235,997

UNITED STATES PATENT OFFICE 2,235,997

PRINTING INK

Clarence E. Irion, Montclair, N. J., assignor to General Printing Ink Corporation, New York, N. Y., a corporation of Delaware No Drawing. Application August 11, 1939, Serial No. 289,593

2 Claims. (Cl. 134—36)

This invention relates to printing inks of the type especially suitable for high speed intaglio or rotogravure printing, and more particularly to such inks which are rapidly drying and contain mixtures of asphalts, gilsonite and the like with fast evaporating solvents.

In the past, rotogravure inks have been almost universally compounded of body or binder materials such as gilsonite, asphalts, gums and the like dissolved in aromatic hydrocarbon solvents such as benzol and toluol. These solvents present the disadvantage of being extremely toxic and hazardous to the health of the workmen, but their use has been continued because of the lack of other solvents in a commercially feasible price range, which would operate satisfactorily to produce all the qualities necessary in an ink of this type.

The petroleum hydrocarbons, while readily available in superabundance and in general usage and even cheaper than the aromatics, were unsatisfactory in having a limited solvent power for most of the suitable binders for such inks. Moreover, compositions having a high percentage of petroleum solvents, exhibited very poor drying due to slow solvent release, resulting in a tacky, sticky film or impression, subject to smearing, offsetting and other troubles.

Other common organic solvents which were suitable in characteristics were economically unsuitable because of their high prices.

One of the objects of the present invention is to provide a printing ink of the intaglio type which is capable of satisfactory printing at the highest speeds used in the printing art with the prior art inks but is free from the toxic characteristics of commercial rotogravure inks.

Another object of the invention is the preparation of such inks with the use of non-toxic solvents which evaporate rapidly and with the rapid solvent release to produce a hard, non-tacky, non-smearing, non-offsetting film.

A further object is to prepare such inks at a cost comparable to that of the prior art commercial inks.

Other objects and advantages of the invention will be apparent from the description thereof and the appended claims.

I have discovered that although, as long known, petroleum naphthas from their inherent characteristics are unsuited for use, as such, as the solvent portion of a rotogravure ink, nevertheless, nitro-paraffines may be so combined with certain petroleum naphthas as to provide a very satisfactory solvent to be used with asphalt, gilsonite, and bituminous mixtures such as heretofore used in the formation of intaglio inks. The nitro-paraffines have a high surface tension and the capacity to impart to the petroleum naphthas of properly coordinated range of carbon atom content and boiling point, at least as good solvent characteristics as benzol has with respect to the gilsonite, etc., binders, so that the mixture of nitro-paraffine and petroleum naphtha becomes an excellent solvent for material of bituminous nature, like the gilsonite and asphalts, and this desirable solvent capacity is attained without the attendant toxicity hazards present in benzol and the like, heretofore generally used in such inks.

By properly selecting the nitro-paraffine with respect to the petroleum naphtha, the volatility of the mixture as well as the surface tension thereof may be greater than that of benzol if desired. The non-toxic and volatile properties of the petroleum naphtha may be fully taken advantage of by the selection of a nitro-paraffine of similar non-toxic properties and of such character that the mixture will have great volatility, so that the highest printing speeds used in the art may be readily attained.

I have found that very satisfactory practical operating results may be attained by providing an ink which contains 35% by weight of gilsonite in solution and which has a viscosity of from 15 to 55 centipoises at ordinary room temperature of 25° C. Such a solution is a very satisfactory ink for use in the intaglio process. Such an ink solution may be obtained by using a solvent containing 80% to 95% of the selected petroleum naphtha and 20% to 5% of nitro-paraffine, and dissolving gilsonite in such solution to give a gilsonite content of 10% to 35% by weight in the solution. The nitro-paraffine may be employed in larger amounts as required for special purposes.

The following example is an illustration of a satisfactory ink formula of my invention—

| | Weight Per cent |
|---|---|
| Gilsonite | 33 |
| Petroleum naphtha (B. P. 58°–85° C.) | 62 |
| Nitromethane | 5 |
| | 100 |

Other nitro-paraffines of similar high volatility may be used, such as nitro-ethane and nitro-propane. And petroleum naphthas having a boiling point of the order of 58°–125° C. may be used. The solvent constituents may be thus admixed to give an ink having an evaporating range of the order of 100° C. or substantially below which is suitable for the high printing speeds stated above.

The composition such as stated in the example above has a viscosity of 46 centipoises at 25° C. and is suitable for printing speeds of 1000 to 1400 feet per minute. By increasing or decreasing the proportion of solvent printing speeds may be correspondingly increased or decreased if desired.

The gilsonite referred to may be replaced in part or in whole by asphalt such as generally used in the intaglio printing ink field. And also natural and residual asphalts of known kind may be used. Also pigments or extenders may be used in order to alter the color or intensity of color or opacity as required and to produce ink of the desired properties.

While the above sets forth a preferred embodiment for the practicing of my invention, it is to be understood that departures may be made therefrom within the scope of the invention as described and claimed.

What is claimed is:

1. An ink of the character described comprising as a major body or binder constituent a solution comprising up to 35% by weight of one of the class of asphalt materials consisting of gilsonite, asphalts, or mixtures thereof, dissolved in a mixed solvent having substantially as good solvent characteristics as benzol for said gilsonite, asphalt, or mixtures thereof, said solvent comprising from 80–95% of petroleum naphtha having a boiling range of 58–125° C. and from 20–5% of nitroparaffin having a boiling temperature comparable to the boiling range of the petroleum naphtha, said solvent material being selected to give the solution a viscosity of the order of not more than 50 centipoises at 25° C.

2. An ink of the character described comprising as a major body or binder constituent a solution comprising up to 35% by weight of one of the class of asphalt materials consisting of gilsonite, asphalts, or mixtures thereof, dissolved in a mixed solvent having substantially as good solvent characteristics as benzol for said gilsonite, asphalt, or mixtures thereof, said solvent comprising from 80–95% of petroleum naphtha having a boiling range of 58–125° C. and from 20–5% of nitroparaffin having a boiling temperature comparable to the boiling range of the petroleum naphtha, said nitroparaffin being one of a group consisting of nitromethane, nitroethane and nitropropane, said solvent material being selected to give the solution a viscosity of the order of not more than 50 centipoises at 25° C.

CLARENCE E. IRION.